(12) United States Patent
Barlow (10) Patent No.: US 7,240,633 B2
(45) Date of Patent: Jul. 10, 2007

(54) UNDERWATER CHAIN STOPPER AND FAIRLEAD APPARATUS FOR ANCHORING OFFSHORE STRUCTURES

(75) Inventor: Robert James Barlow, Brantford (CA)

(73) Assignee: Timberland Equipment Limited, Woodstock, Ontario (CA)

(*) Notice: Subject to any disclaimer, the term of this patent is extended or adjusted under 35 U.S.C. 154(b) by 0 days.

(21) Appl. No.: 10/836,796

(22) Filed: Apr. 30, 2004

(65) Prior Publication Data

US 2005/0241558 A1 Nov. 3, 2005

(51) Int. Cl.
*B63B 21/18* (2006.01)
(52) U.S. Cl. .................................... 114/200
(58) Field of Classification Search ............ 114/199, 114/200, 293; 254/389, 391, 415
See application file for complete search history.

(56) References Cited

U.S. PATENT DOCUMENTS

| | | | | |
|---|---|---|---|---|
| 3,805,728 | A * | 4/1974 | Abraham | 114/200 |
| 4,742,993 | A * | 5/1988 | Montgomery et al. | 254/389 |
| 5,364,075 | A * | 11/1994 | Montgomery | 254/415 |
| 5,441,008 | A * | 8/1995 | Lange | 114/293 |
| 5,845,893 | A | 12/1998 | Groves | |
| 5,934,216 | A | 8/1999 | Childers et al. | |
| 6,148,755 | A | 11/2000 | Wudtke et al. | |
| 6,435,121 | B2 | 8/2002 | Siring | |
| 6,439,146 | B2 | 8/2002 | Seaman et al. | |
| 6,817,595 | B1 * | 11/2004 | Jenkins et al. | 254/389 |
| 2005/0072347 | A1 * | 4/2005 | Niebur | 114/293 |

FOREIGN PATENT DOCUMENTS

WO PCT/CA2005/000641 4/2005

* cited by examiner

*Primary Examiner*—Ed Swinehart
(74) *Attorney, Agent, or Firm*—Woodling, Krost and Rust (57) ABSTRACT

An underwater chain stopper and fairlead apparatus for offshore structures, drilling platforms, ships or other vessels. The apparatus comprises a mounting member, a fairlead member and a chain stopper member. The mounting member is attached to an underwater surface of the offshore structure or vessel and includes a bracket for coupling the fairlead member. The bracket may comprise a hinge allowing the fairlead member to pivot in an approximately horizontal plane. The chain stopper member is coupled to the fairlead member through a hinge which allows the chain stopper member to pivot with respect to the fairlead member in an approximately vertical plane. The chain stopper member includes a chain stopper flapper having a horseshoe shaped opening at one end. The other end of the flapper is connected to the chain stopper member through a hinge which allows the flapper to swing between an open position and a closed position. In the open position, the chain links for the anchor chain are allowed to pass by the horseshoe shaped opening on the flapper. The horseshoe shaped opening also includes a chain link seat which stops movement of the anchor chain through the chain stopper member when the flapper is in the closed position. The chain stopper flapper moves to the closed position under the force of gravity to provide a self-locking chain stopper. A latch mechanism is provided for latching the chain stopper flapper in an open position.

10 Claims, 8 Drawing Sheets

UNDERWATER CHAIN STOPPER AND FAIRLEAD APPARATUS FOR ANCHORING OFFSHORE STRUCTURES

FIELD OF THE INVENTION

The present invention relates to anchoring and mooring devices for offshore structures, and more particularly to an underwater chain stopper and fairlead apparatus for anchoring an offshore structure.

BACKGROUND OF THE INVENTION

Offshore structures, such as floating production and drilling platforms are generally held in place using mooring or anchor chains attached to the floating structure by fixed chain stoppers. The chain stoppers are typically mounted on the deck of the floating structure with a bending shoe at the outboard edge of the deck. In some installations, the anchor chain is then guided down the side of the floating structure to a chain fairlead attached to the structure at or below the surface of the water.

The anchor or mooring chains are deflected below the water surface for two reasons. First, the mooring loads provide better stability and are more easily distributed over the floating structure, the lower the chains are attached to the structure. Secondly, there is less chance of other vessels colliding or hitting the mooring chains, the lower the mooring chains are positioned in the water.

A disadvantage in utilizing a chain fairlead is that the mooring chain must be deflected around the fairlead under extremely high mooring loads that are produced during operation of the floating offshore structure. This leads to premature chain wear and also excessive stress in the chain links.

Accordingly, there still remains a need for an improved chain stopper and fairlead device for mooring offshore platforms.

BRIEF SUMMARY OF THE INVENTION

The present invention provides an underwater chain stopper and fairlead apparatus for mooring or anchoring offshore structures, floating production storage offloading vessels and the like, drilling platforms or other types of vessels at sea or offshore.

In a first aspect, the present invention provides apparatus for mooring an offshore structure, the offshore structure has an underwater surface, and the apparatus comprises: a frame member, the frame member being coupled to the underwater surface; a mounting member, the mounting member being connected to the frame member; a fairlead; a chain stopper; the mounting member including a shaft for supporting the fairlead and a pivoting coupler for coupling the chain stopper.

In another aspect, the present invention provides an underwater apparatus for anchoring an offshore structure, the underwater apparatus comprises a frame member having a mounting surface for coupling to an underwater portion of the offshore structure, a mounting member coupled to the frame member, the mounting member includes a bracket for holding a fairlead, and the mounting member includes a pivotal coupler for coupling a chain stopper.

In yet another aspect, the present invention provides an underwater device for coupling an anchor chain for mooring an offshore structure having a submerged surface, the underwater device comprises: a fairlead housing, the fairlead housing includes a pivoting mounting bracket for attaching the fairlead housing to the submerged surface, the fairlead housing includes a fairlead; a chain stopper housing, the chain stopper housing is pivotally connected to the fairlead housing, the chain stopper housing includes a self-closing mechanism for engaging chain links in the anchor chain; the chain stopper housing is movable in the direction of the anchor connected to the anchor chain.

In another aspect, the present invention provides apparatus for mooring an offshore vessel with one or more anchors coupled to respective anchor chains, the offshore vessel has a hull, the apparatus comprises: means for guiding the anchor chain from the surface of the offshore vessel to the anchor; means for mounting the guiding means to the hull below the surface, the means for mounting provides a pivotable connection between the hull and the means for guiding; means for stopping the anchor chain, the means for stopping being coupled to the means for guiding through a second pivotable connection.

In another aspect, the present invention provides a fairlead latch mechanism for securing an anchor line comprising a chain with links and a section of cable between an offshore structure and an anchor, the fairlead latch mechanism comprises: a fairlead housing having a pivoting mounting bracket attached to a surface of the offshore structure, and the fairlead housing includes a sheave; a latch housing; a pivoting mounting member for coupling the latch housing to the fairlead housing; and the latch housing includes a chain stopper, the chain stopper includes a flapper and a frame member, the flapper has a slot opening at one end for allowing passage of chain links in the anchor line, and the flapper includes a chain link seat at the end for blocking any one of the chain links and preventing passage of the anchor line.

In another aspect, the present invention provides an underwater fairlead and chain stopper apparatus for use with one or more anchor chains and connected anchors for mooring an offshore vessel having an underwater structure, the apparatus comprises: a mounting member, the mounting member is affixed to the underwater structure of the offshore vessel; a guide member, the guide member having a pivotable connector for coupling to the mounting member and allowing the guide member to pivot in an approximate horizontal plane, the guide member including a fairlead adapted for use with the anchor chain; a stopper member, the stopping member having a pivotable connector for coupling the stopper member to the guide member, the pivotable connector allowing the stopper member to pivot in an approximate vertical plane, the stopper member includes a chain stopper member for engaging the anchor chain and preventing substantial movement of the anchor chain when engaging; a latching mechanism, the latching mechanism has a lever member and an actuator coupled to the lever member, the lever member being responsive to the actuator to latch the chain stopper member in a disengaged position, the disengaged position permitting movement of the anchor chain through the stopper member; and a load sensor, the load sensor being incorporated with the pivotable connector for the stopper member, and the load sensor produces an output signal indicative of anchor chain load being applied to the stopper member.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made, by way of example, to the accompanying drawings which show embodiments of the present invention, and in which.

DETAILED DESCRIPTION OF THE EMBODIMENTS

Figure 1:
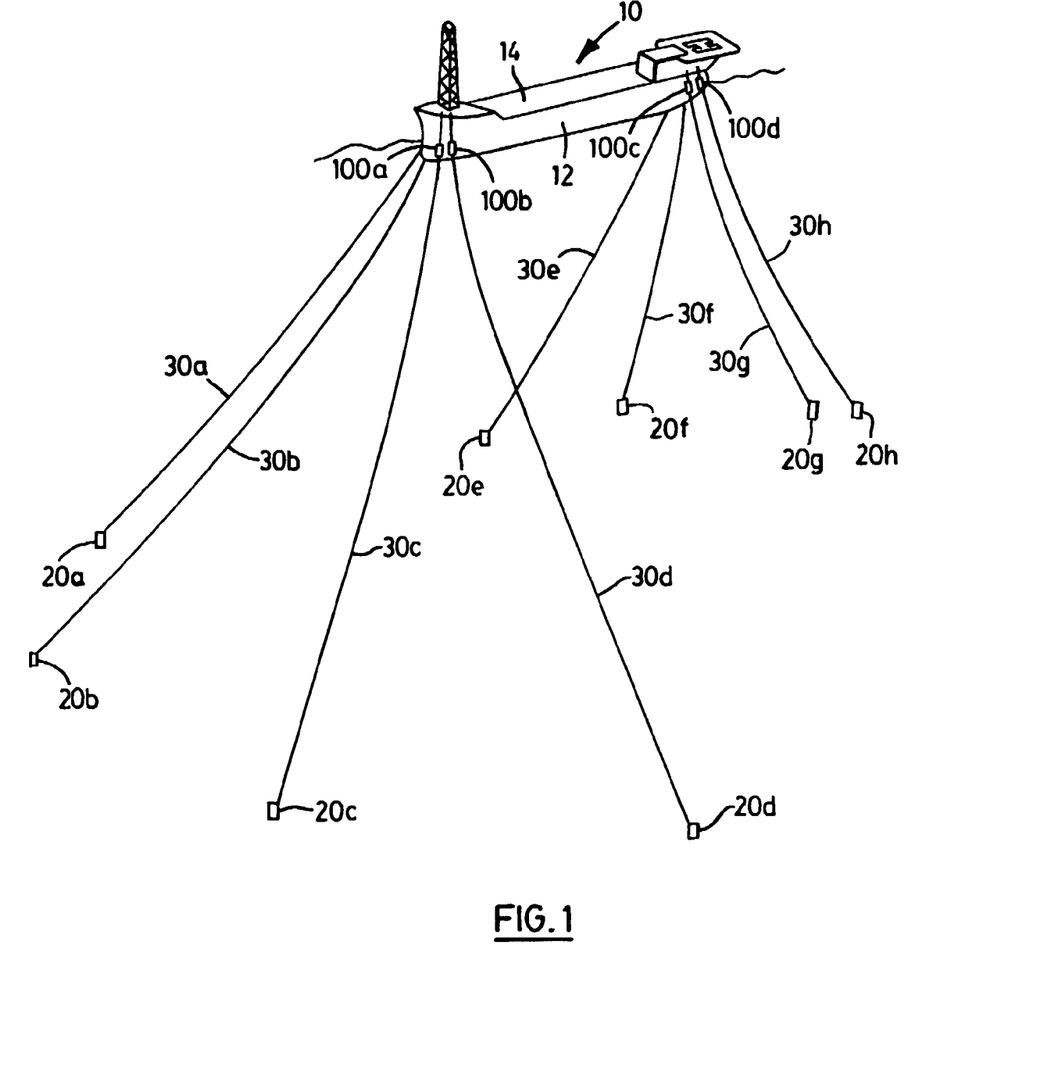
FIG. 1 shows in a diagrammatic form an offshore structure, such as a floating production and storage and offloading (FPSO) vessel with an underwater chain stopper and fairlead apparatus in accordance with the present invention.

Reference is first made to FIG. 1 which shows in a diagrammatic form an offshore structure for use with an underwater chain stopper and fairlead apparatus according to the present invention. The floating offshore structure is indicated generally by reference 10 and comprises floating production/storage vessels, for example, floating production storage and offloading (FPSO), floating storage and offloading (FSO) vessels, as well as drilling platforms. The offshore structure or vessel 10 is stabilized and moored over a desired site using underwater anchors 20, indicated individually as 20a, 20b . . . 20h hooked into the ocean floor. The underwater anchors 20 are coupled to the platform 10 through respective anchor lines 30, indicated individually as 30a, 30b, 30c . . . 30h. The anchor lines 30 comprise anchor chains and heavy duty cable. The tension in the anchor line 30 prevents the offshore structure 10 from drifting and pitching as a result of high winds, tides or currents. While described in the context of offshore structures, such as FPSO and FSO structures, it is to be appreciated that the underwater chain stopper and fairlead apparatus according to the present invention is suitable for other types of vessels and mooring or anchoring applications.

Each of the anchor lines 30 extends through an underwater chain stopper and fairlead apparatus 100 in accordance with the present invention. The underwater chain stopper and fairlead apparatus 100 operates to guide the respective anchor line 30 during the setting of the anchor 20 and maintains the proper tension on the anchor line 30. The underwater chain stopper and fairlead apparatus 100, indicated individually by 100a, 100b, 100c and 100d in FIG. 1, are mounted below the water surface on the hull 12 of the offshore structure or vessel 10, e.g. FPSO.

As will be described in more detail below with reference to FIGS. 2 to 5, the chain stopper and fairlead apparatus 100 comprises a fairlead unit 102 and a chain stopper unit 104. The fairlead unit 102 includes a pivoting mounting member 106 which is mounted or affixed to the hull 12 of the vessel 10. The chain stopper unit 104 is connected to the fairlead unit 102 through a pivot joint 108. The pivoting mounting member 106 allows the fairlead unit 102 to rotate, in a generally horizontal plane, about a pivot point 110 thereby reducing stresses between the fairlead unit 102 and the hull 12. The pivot joint 108 between the fairlead unit 102 and the chain stopper unit 104 allows the chain stopper 104 to rotate about this pivot point, in a generally vertical plane, and thereby reduce stresses imposed on the anchor line 30 and the hull 12.

Reference is made to FIGS. 2 to 5, which show the underwater chain stopper and fairlead 100 in more detail. In the figures, like references indicate like elements and/or features.

Figure 2:
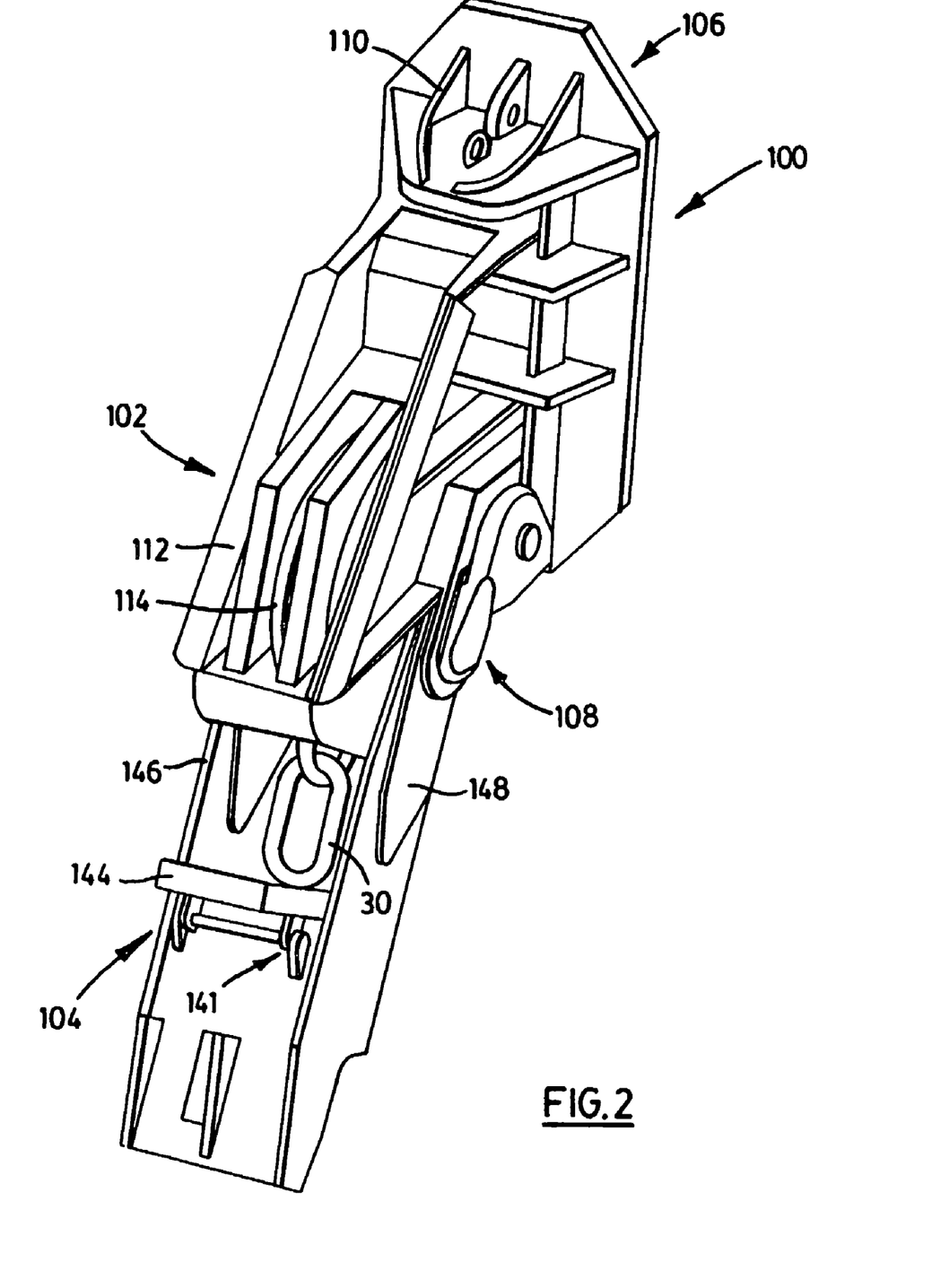
FIG. 2 shows an isometric view of an underwater chain stopper and fairlead apparatus in accordance with the present invention.
Figure 3:
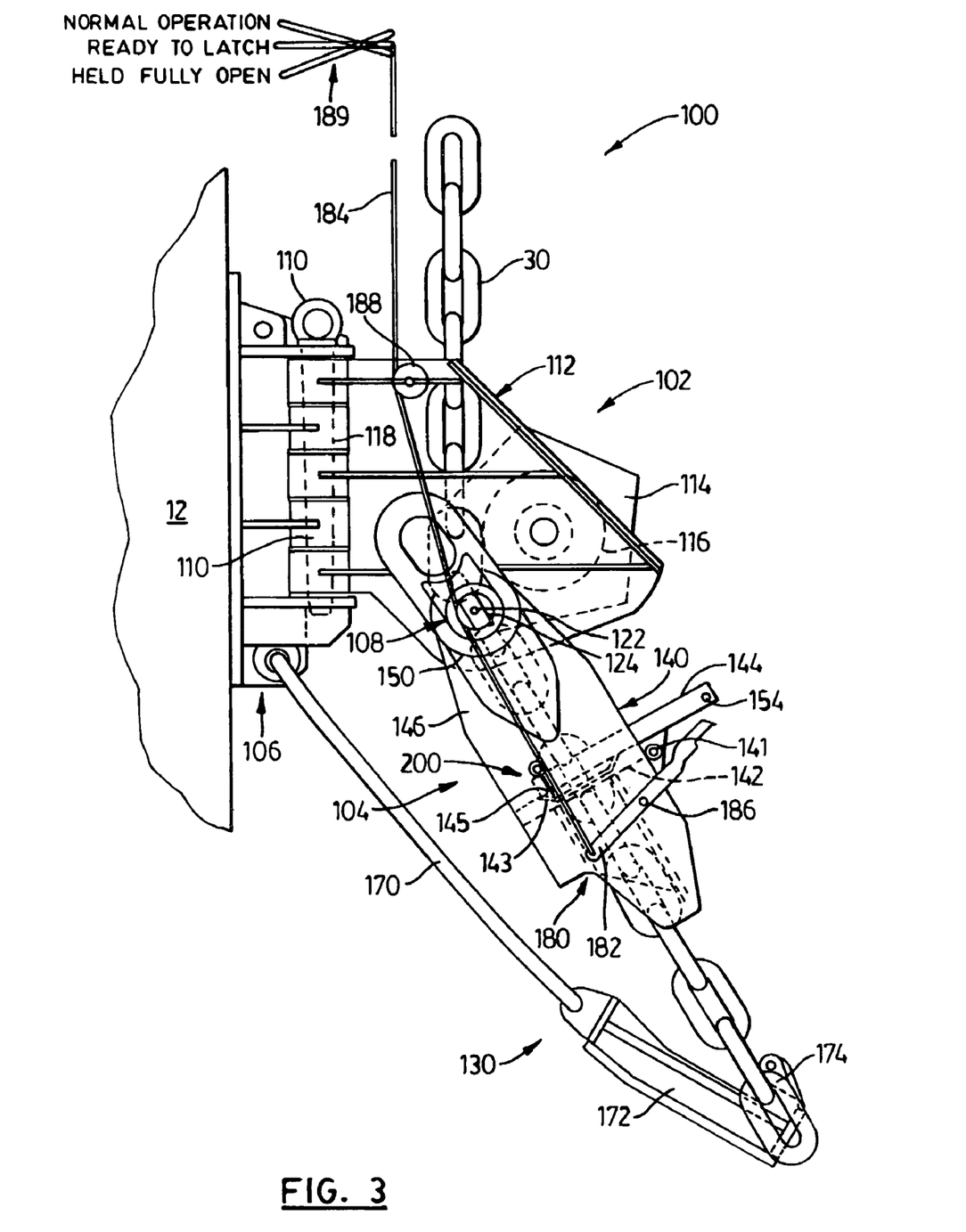
FIG. 3 shows a more detailed side view of the underwater chain stopper and fairlead apparatus of FIG. 2.

As shown in FIGS. 2 and 3, the underwater chain stopper and fairlead 100 comprises the fairlead unit 102, the chain stopper unit 104 and a safety cable unit 130.

The fairlead unit or member 102 comprises a housing or fairlead mounting member 112 and a fairlead or sheave 114. The fairlead housing 112 supports the fairlead 114, which is typically pocketed to fit the specific mooring chain in the anchor line 30, for example, having 3 or more pockets that match the chain link size. The fairlead 114 also includes a center hub 116. The center hub 116 has a groove and serves to guide the pulling wire (or synthetic rope) which together with the anchor chain form the anchor line 30. The fairlead 114 directs the chain to and from the chain stopper 104 and up the side of the hull 12 (FIG. 1) to the surface or deck of the offshore floating platform 10 (FIG. 1). Although shown as a pentagon, the fairlead 114 may comprise a circular, pocketed or other configuration. In another embodiment, the fairlead 114 may be replaced by a fixed bending shoe.

The fairlead unit 102 is coupled to the pivoting mounting member 106 through the pivot pin 110. The pivoting mounting member 106 is welded, bolted or otherwise affixed to the side of the hull 12 (FIG. 1) or vessel being moored. As shown in FIG. 3, the mounting member 106 includes a hinge member 118 which is interconnected to a mating hinge member 120 on the fairlead housing 112. Each of the hinge members 118, 120 has respective sockets which receive the pivot pin 110 (shown in broken outline in FIG. 3) and holds the hinged pivot joint together. It will be appreciated that a pivoting joint between the fairlead 102 and the hull 12 may be implemented using other types of joints or pivoting mechanisms. It will be further appreciated that there may be situations where a pivoting joint may not be used. Removal of the pivot pin 110 allows the entire underwater chain stopper and fairlead device 100 to be disconnected from the mounting member 106 and raised to the deck 14 of the floating offshore structure or vessel 10 (FIG. 1) for maintenance and/or repair.

Referring to FIG. 3, the chain stopper unit 104 is coupled to the fairlead unit 102 by the pivot joint 108. The pivot joint 108 allows the chain stopper unit 104 to pivot up and down in relation to the fairlead unit 102 and extend in the direction of the anchor line 30 (FIG. 1) and the anchor 20. This movement serves to absorb forces in the anchor line 30 as a result of the offshore structure 10 (FIG. 1) moving or pitching in wind and/or waves. The pivot joint 108 may be implemented using two instrumented load pins, indicated by references 122 and 124, respectively. The instrumented load pins 122, 124 operate in known fashion as a load sensor or strain gage to provide an output signal (transmitted via a cable connection to a monitor or display (not shown) on the deck 14 of the floating offshore structure 10) which is indicative (i.e. proportional) of the load being placed on the chain stopper 104 by the anchor line 30. In another embodiment, the pivot joint 108 is implemented using a pin or shaft which does not include a load sensor mechanism. It will be appreciated that the arrangement of the chain stopper unit 104 according to this aspect eliminates a fairlead or a bending shoe directly bearing the mooring load of the anchor chain 30.

The chain stopper unit 104 comprises a housing 140, a chain stopper frame member 142 and a chain stopper flapper 144 as shown in FIG. 3. As shown in FIG. 5(b), the housing member 140 comprises two upper frame sections 146 and 148. Each of the upper frame sections 146, 148 includes a bushing 150. The bushings 150 receive the instrumented load pins 122, 124, i.e. the strain gage or load sensor, (or a single pin or shaft in a non-instrumented implementation) and couple the chain stopper unit 104 to the fairlead unit 102.

Figure 4B:
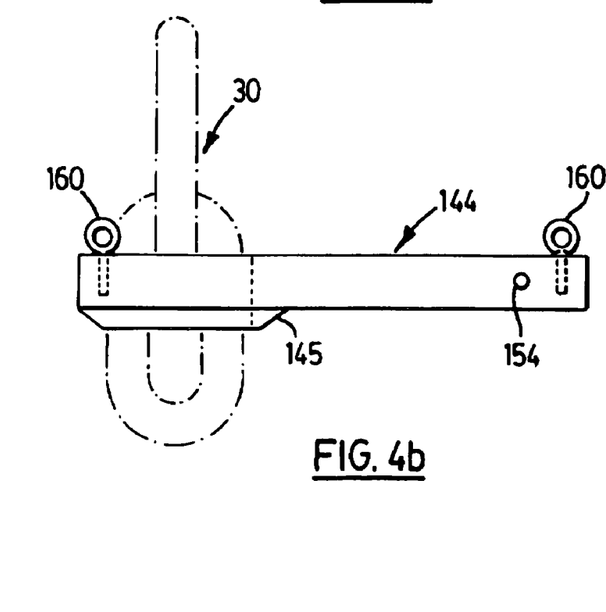
FIG. 4(b) shows a side sectional view of the chain stopper flapper of FIG. 4(a)
Figure 4C:
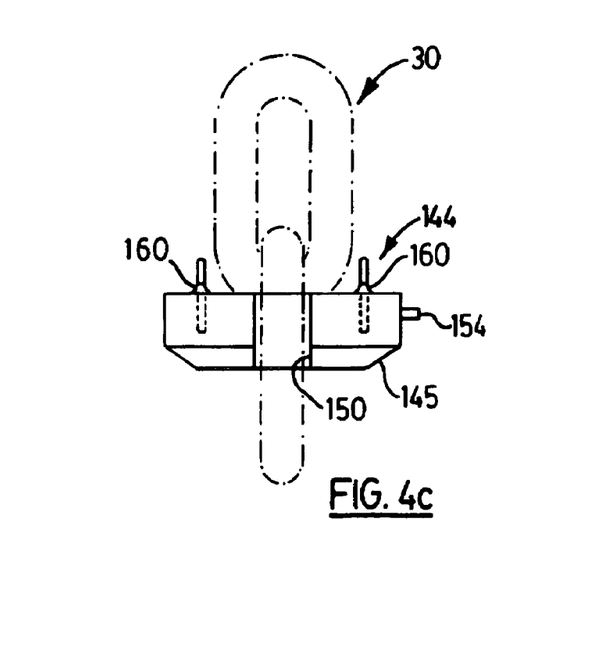
FIG. 4(c) shows a front view of the chain stopper flapper of FIG. 4(a)
Figure 5A:
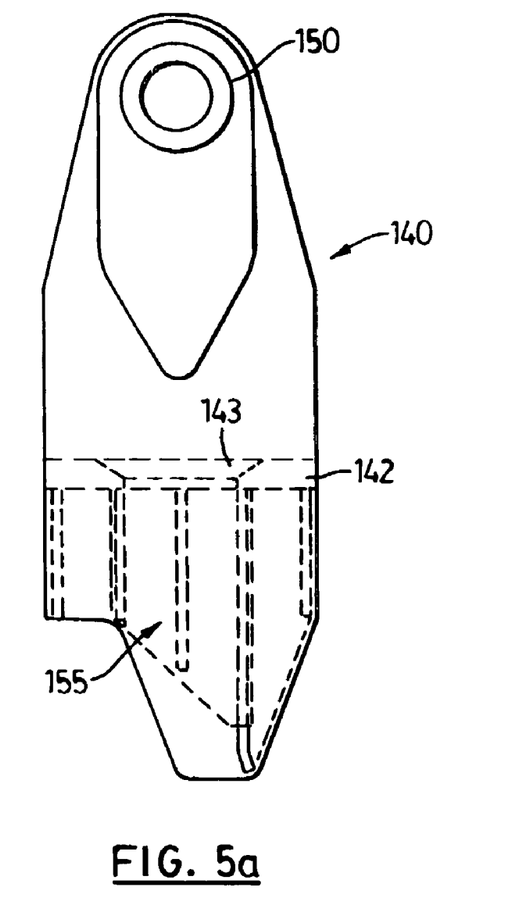
FIG. 5(a) shows a side view of the chain stopper member of FIG. 2.
Figure 5B:
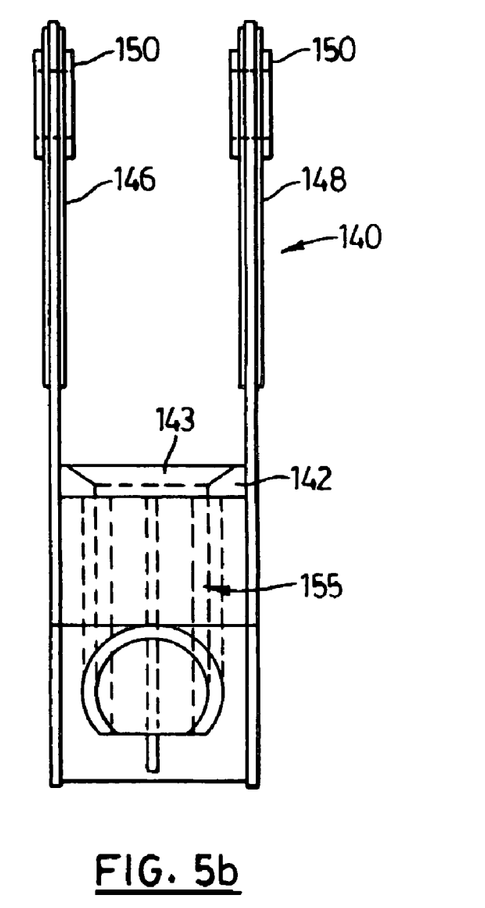
FIG. 5(b) shows a front view of the chain stopper member of FIG. 5(a)

The chain stopper frame member 142 has a conical shaped socket or seat 143 (as shown in FIGS. 5(a) and 5(b). The conical shaped socket 143 receives a corresponding conical shape extension 145 (as shown in FIGS. 4(b) and 4(c)) formed or attached to the base of the chain stopper flapper 144. The mating surfaces of the conical shaped socket 143 and the conical shaped extension function to provide linear support of the load from the anchor chain 30 and also provide additional support or reinforcement to the horseshoe shaped opening (described below) incorporated into the chain stopper flapper 144. The conical extension 145 also aligns the chain stopper flapper 144 with the chain stopper frame member 142 in a closed or chain stop position 147 as shown in FIG. 3. The chain stopper flapper 144 is coupled to the chain stopper housing 140 with a hinge or pivoting joint 141. As will be described in more detail, the hinge 141 allows the chain stopper flapper 144 to swing through a defined arc, which comprises a closed or chain stop position 200 (FIG. 3), a normal operation position 202 (FIG. 6), a ready to latch position 204 (FIG. 7), and a fully open position 206 (FIG. 8). The chain stopper flapper 144 includes a latching pin 154 which functions in conjunction with a latching mechanism (described below) to hold the flapper 144 in the fully open position 206 (FIG. 8).

Referring to FIGS. 5(a) and 5(b) the chain stopper frame member 142 includes a pair of interconnected slot openings arranged in an open cruciform structure, indicated by reference 155 and shown in broken outline. The cruciform slot openings 155 are sized to allow passage of the chain links which are interconnected at approximately right angles to each other. The cruciform openings 155 are also of sufficient size to pass rope sockets or other chain attachments (not shown). The cruciform slot structure 155 functions to move the chain links into the proper orientation for engagement with the slot openings 150 and 152 (FIG. 4(a)) in the chain stopper flapper 144.

Figure 4A:
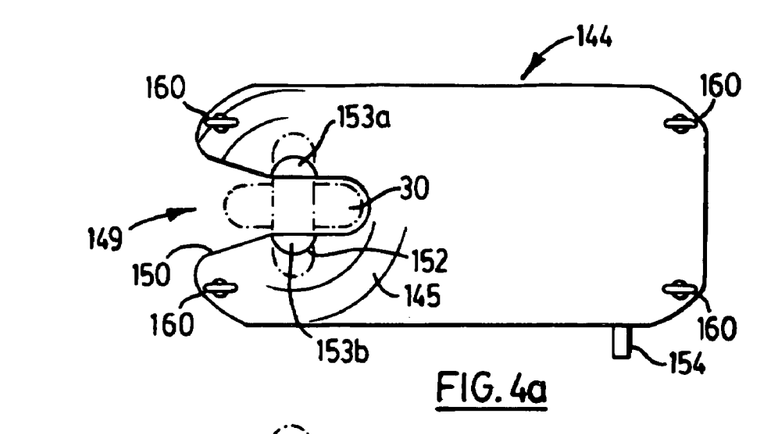
FIG. 4(a) shows a top view for a chain stopper flapper in the apparatus of FIG. 3.

As shown in FIG. 4(a), the chain stopper flapper 144 comprises a horseshoe shaped configuration and has an open end 149 which includes a cut-out slot 150 and a second slot 152. The cut-out slot 150 is sized to allow passage of links in the chain 30. The second slot 152 is oriented generally perpendicular to the cut-out slot 150 and forms a contoured pocket which is sized for the link size in the chain 30. As shown, the contoured pocket comprises a pair of chain link seats 153a and 153b. The chain link seats 153 are shaped to match the contour of the chain links in the anchor chain 30 so as to provide maximum contact surface with the chain link being held in the flapper 144. The chain stopper flapper 144 pivots out of way, i.e. in the direction of arrow 151 (FIG. 6) when the anchor chain 30 is pulled inward or up, e.g. to lift the anchor 20 (FIG. 1), reset the anchor 20 or to tension the anchor chain 30. As the anchor chain 30 is let out, the chain stopper flapper 144 moves downward, i.e. in the direction of arrow 149 (FIG. 6) until the conical surface 145 is seated in the conical socket 143 in the chain stopper member 142 as shown in FIG. 3, and the chain link in the anchor line 30 is engaged by the slot 152 (FIG. 4(a)). With the configuration of the pivot hinge 141, the chain stopper flapper 144 is always trying to close under the force of gravity thereby providing a self-locking chain or safety stop. In this way, the chain stopper flapper 144 operates as a self-closing or self-locking mechanism or ratchet.

As shown in FIGS. 4(a) to 4(c), the chain stopper flapper 144 may be drilled and tapped to accept eye bolts 160, or welded lifting lugs may be installed, which facilitate moving and positioning the flapper 144 during assembly or maintenance of the device 100.

Referring again to FIG. 3, the safety cable mechanism 130 comprises a safety cable 170 and a locking coupler 172. The safety cable 170 is securely fastened or coupled at one end to the mounting member 106 and comprises a steel or synthetic chain or cable. The safety cable 170 may also comprise a synthetic rope or cable for some applications. The locking coupler 172 is fastened to the other end of the safety cable 170, and comprises a bracket 174 which is affixed to a chain link (or the cable) in the anchor line 30. The safety cable mechanism 130 can temporarily take the mooring load of the anchor chain 30 so that the underwater chain stopper and fairlead device 100 can be lifted onto the deck of the floating platform structure 10 (FIG. 1) for periodic maintenance, inspection or repair. The safety cable mechanism 130 also provides a secondary or back-up connection to the anchor line 30 should the rode 130 above the locking coupler 172 disconnect or break. The safety cable mechanism 130 comprises an optional device which is not necessarily installed on each or every device 100.

As shown in FIG. 3, the underwater chain stopper and fairlead mechanism 100 includes a latching mechanism 180. The latching mechanism 180 functions to hold the chain stopper flapper 144 in the open position when desired or required. The latching mechanism 180 comprises a latch lever member 182 and a control cable 184. The level member 182 is coupled to the fairlead housing 140 by a hinge pin 186. The latch lever 182 is actuated by the control cable 184 to pivot or swing about the hinge pin 186 and engage and disengage the latching pin 154 on the chain stopper flapper 144 as will be described in more detail with reference to FIGS. 7 and 8. The control cable 184 is guided to the chain stopper and fairlead apparatus 100 using one or more fairleads 188 (FIGS. 6 to 8) which are secured to the hull 12 (FIG. 1). The control cable 184 is manipulated on the deck 14 of the offshore structure or vessel 10 (FIG. 1) using a lever mechanism 189, for example, a lever arm or a winch (not shown).

Figure 6:
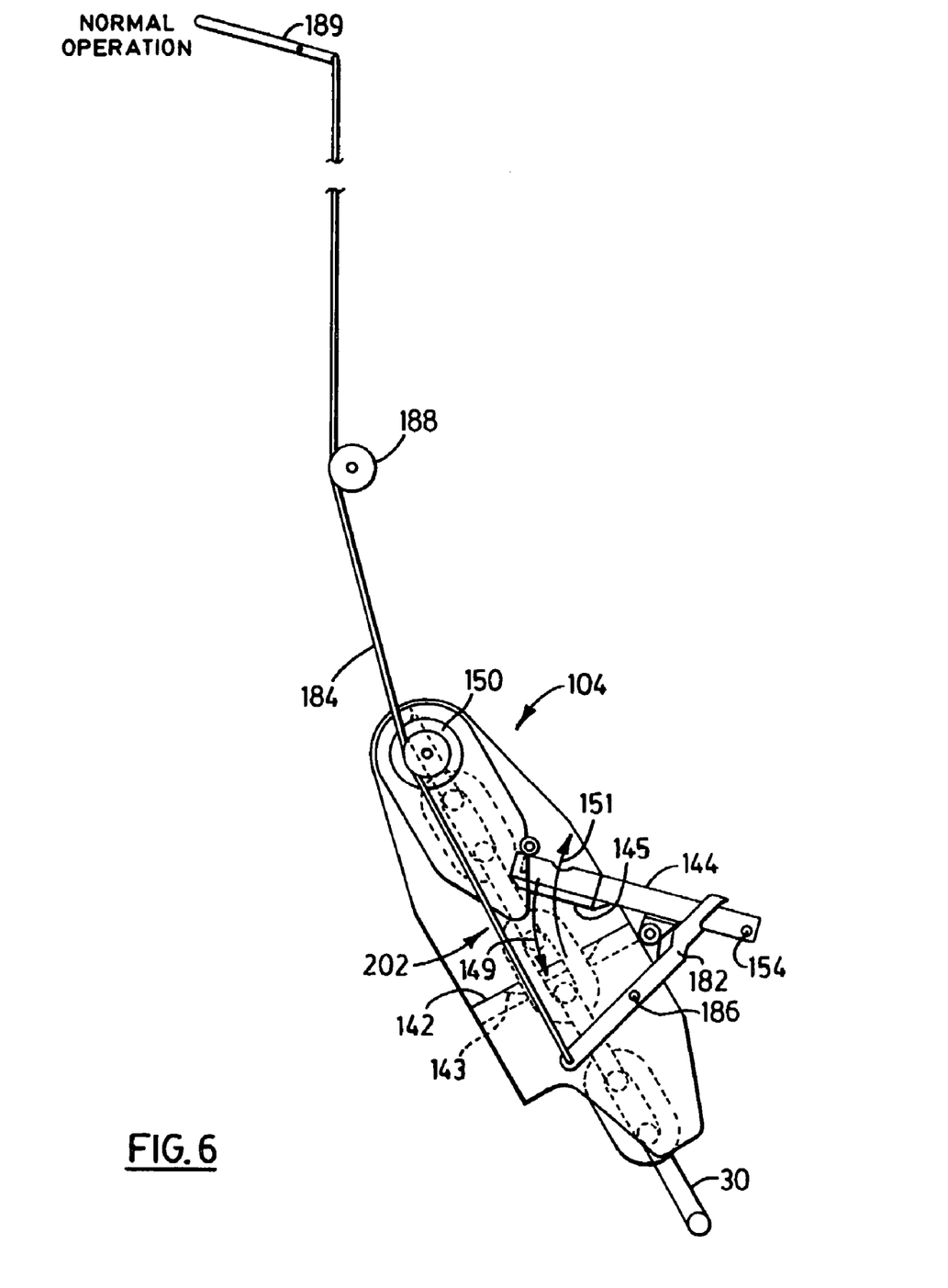
FIG. 6 shows operation of the chain stopper and the flapper when the anchor chain is raised.

The normal mode of operation indicated generally by reference 202 is illustrated in FIG. 6. As shown, the chain stopper flapper 144 moves upwards in the direction of arrow 151 as the anchor chain 30 is pulled up or towards to the deck 14 (FIG. 1). After the anchor chain 30 has stopped moving, the chain stopper flapper 144 moves downward toward the chain stopper frame member 142 through the effect of gravity and one of the chain links is engaged in the slot 152 (FIG. 4(a)).

Figure 7:
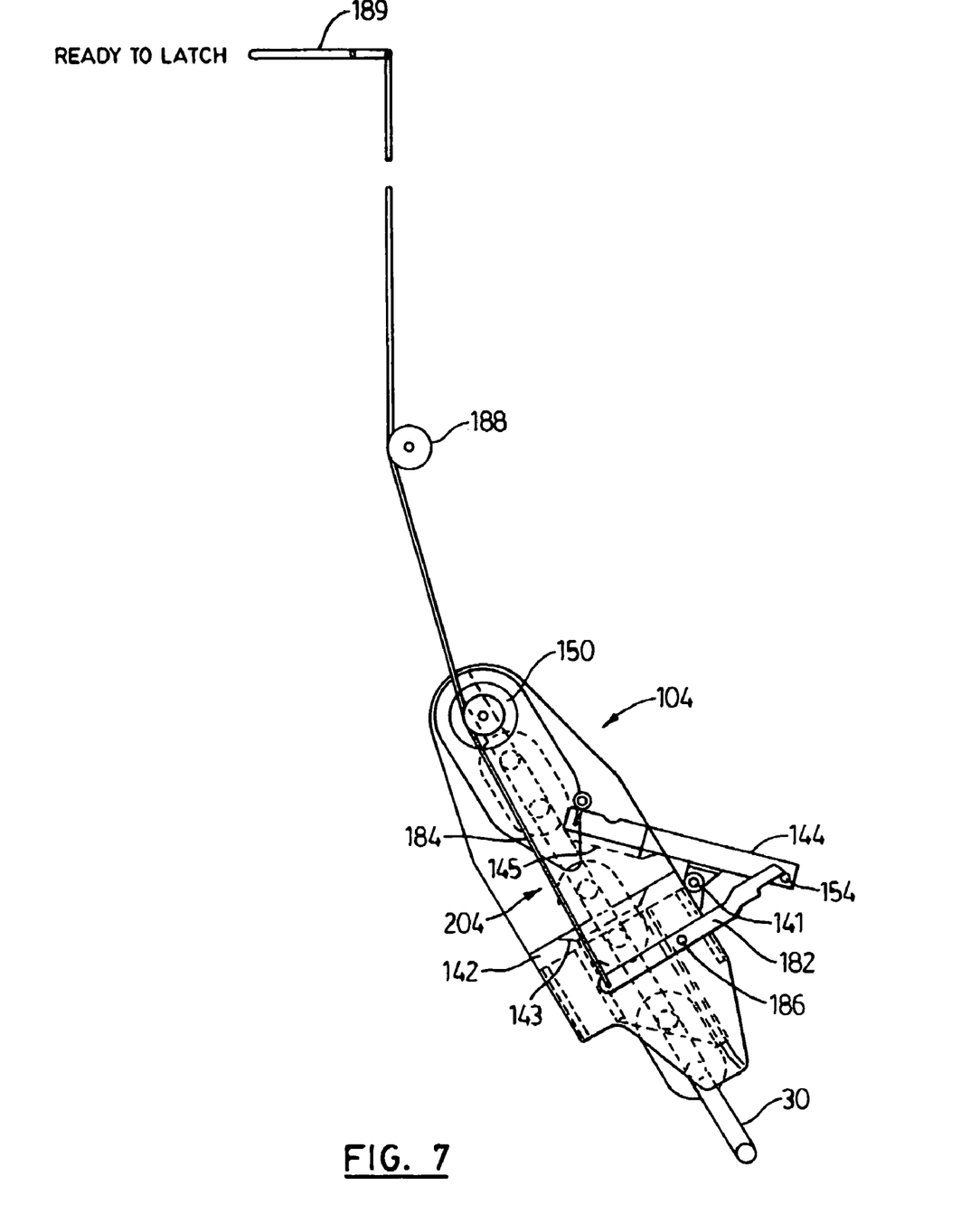
FIG. 7 shows operation of the chain stopper with the flapper engaged by a latch mechanism according to another aspect of the invention.
Figure 8:
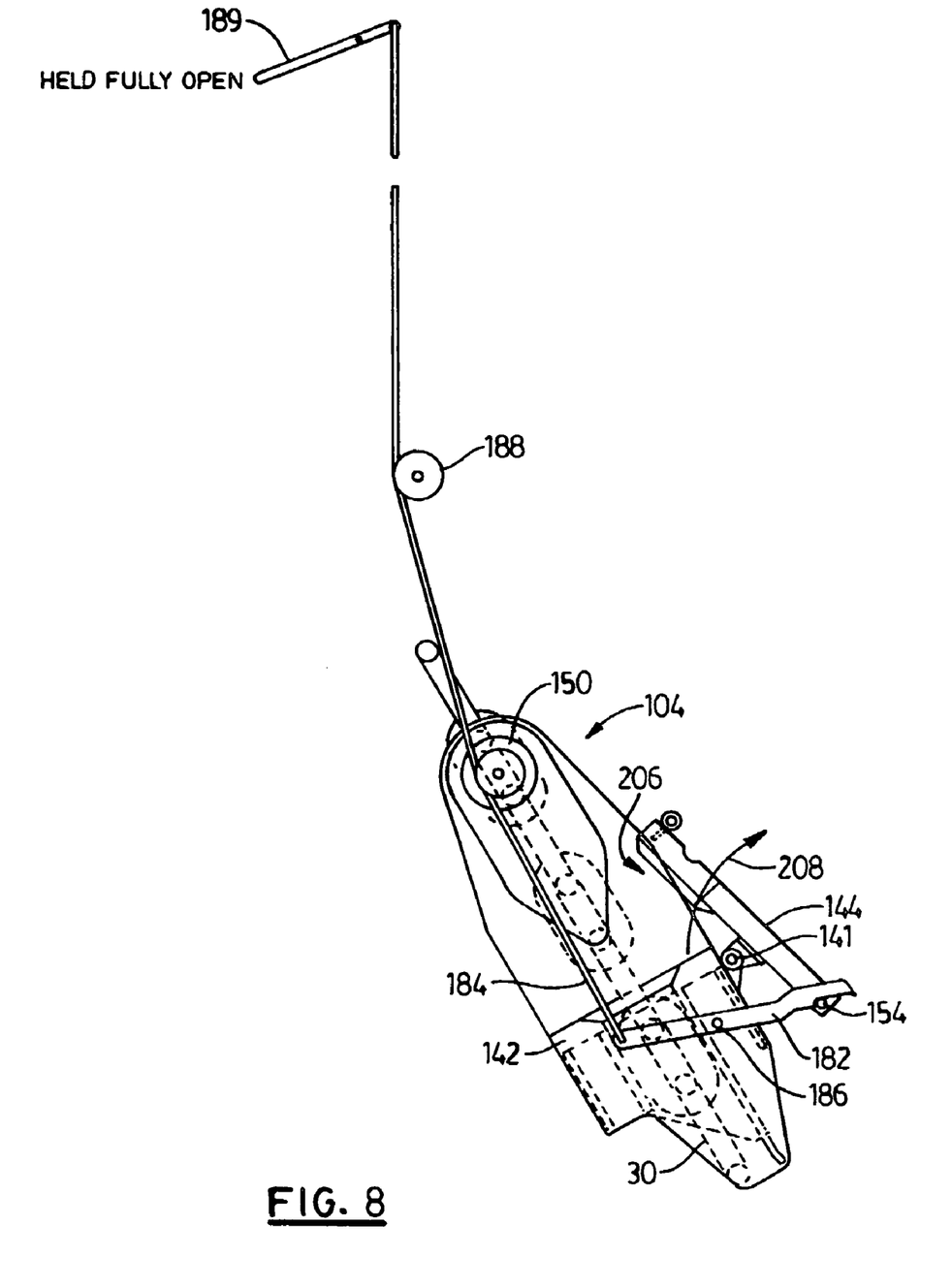
FIG. 8 shows operation of the chain stopper with the flapper latched in a fully open position by the latch mechanism.

The ready to latch mode of operation, indicated generally by reference 204, is illustrated in FIG. 7. The lever mechanism 189 is moved to a 'ready to latch position' and the control cable 184 is actuated to move the latch lever member 182 to a corresponding ready to latch position. The anchor chain 30 is pulled to pivot the chain stopper flapper 144 to an open position, and as the chain stopper flapper 144 pivots open, the latch lever member 182 engages the latching pin 154 on the chain stopper flapper 144. In this position, the chain stopper flapper 144 is engaged open and does not automatically close to the normal operation position 202 (FIG. 6) or the chain stop position 200 (FIG. 3) until the lever mechanism 189 is returned to the 'normal operating position'.

Reference is next made to FIG. 8, which illustrates the fully latched open mode of operation indicated generally by reference 206. In this mode, the chain stopper flapper 144 is pulled further open by the latch lever member 182 which is actuated by the lever mechanism 189 on the deck of the offshore structure 10 (FIG. 1). The latch lever member 182 engages the latching pin 154 on the chain stopper flapper 144 and through actuation of the lever mechanism 189 the latch lever member 182 is pivoted about the hinge pin 186 to push down on the latching pin 154 and further open the chain stopper flapper 144 in the direction of arrow 208. With the chain stopper flapper 144 held open, the anchor chain 30 can be payed outboard. To bring the chain stopper flapper 144 back to the normal operating mode, i.e. self-closing chain stopping mode, the lever mechanism 189 is actuated to disengage the latch lever member 182 from the latching pin 154 thereby allowing the chain stopper flapper 144 to move downwards under the force of gravity.

To remove the underwater chain stopper and fairlead device 100 from the side of the hull 12, the anchor chain 30 is pulled to pivot the chain stopper flapper 144 into an open position to enable passage of the anchor chain 30. The lever mechanism 189 is actuated to move the chain stopper flapper 144 in the fully latched open position 208 as described above with reference to FIG. 8. Once in the fully latched open position, the anchor chain 30 is payed out to transfer load to the safety cable mechanism 130. Then the pivot pin 110 (FIG. 3) can be pulled to separate the underwater chain stopper and fairlead device 100 from the mounting member 106. The underwater chain stopper and fairlead device 100 is free to move along the anchor line 30 and a cable (not shown) attached to the device 100 is used raise the device 100 to the surface.

The present invention may be embodied in other specific forms without departing from the spirit or essential characteristics thereof. Other adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. An apparatus for anchoring an offshore structure, said offshore structure having an underwater surface, said anchoring apparatus comprising:

a frame member, said frame member being coupled to the underwater surface;

a mounting member, said mounting member being connected to said frame member;

a fairlead;

a chain stopper wherein said chain stopper comprises a flapper, said flapper being movable between an open position and a closed position, said flapper having a first slot for allowing passage of chain links in an anchor chain, and a chain link seat for preventing passage of chain links in the anchor chain in said closed position;

said mounting member including a shaft for connecting said fairlead and a pivoting coupler for coupling said chain stopper;

wherein said flapper is responsive to gravity and moves to said closed position under the force of gravity;

a latching mechanism;

said latching mechanism comprising a control cable and a latch lever;

said control cable being coupled to said latch lever;

said latch lever being responsive to said control cable to move between a latching position and an unlatched position; and, in said latching position said latch lever engaging said flapper in said open position.

2. The apparatus as claimed in claim 1, wherein said latching mechanism is further operable in a fully latched position, and, in said fully latched position said flapper being positioned in a fully open position.

3. The apparatus as claimed in claim 1, wherein said frame member includes a coupler for disconnecting said mounting member, and said mounting member having a fastener for receiving a cable for raising said mounting member and said fairlead and said chain stopper to the surface.

4. A fairlead latch mechanism for securing an anchor line comprising a chain with links and a section of cable between an offshore structure and an anchor, the fairlead latch mechanism comprises:

a fairlead housing having a pivoting mounting bracket attached to a surface of the offshore structure, and said fairlead housing including a sheave;

a latch housing;

a pivoting mounting member for coupling said latch housing to said fairlead housing;

said latch housing including a chain stopper, said chain stopper including a flapper and a frame member, said flapper having a slot opening at one end for allowing passage of chain links in the anchor line, and said flapper including a chain link seat at said end for blocking any one of the chain links and preventing passage of the anchor line;

wherein said flapper is responsive to gravity and moves under the force of gravity to a position for preventing passage of the chain links in the anchor line;

wherein said frame member includes a recess on the surface contacting said flapper;

said flapper including an extension on the surface contacting said frame member; and, said extension having a shape substantially the same as said recess so that said extension is seatable in said recess to reinforce said flapper.

5. The fairlead latch mechanism as claimed in claim 4, wherein said slot opening comprises a generally horseshoe shape, and said flapper being made as a unitary piece.

6. The fairlead latch mechanism as claimed in claim 5, wherein said frame member includes a cruciform shaped opening for substantially orienting the chain links with the slot opening in said flapper.

7. An apparatus for mooring an offshore vessel with one or more anchors coupled to respective anchor chains, said offshore vessel having a hull, said apparatus comprising:
   means for guiding the anchor chain from the surface of the offshore vessel to the anchor;
   means for mounting said guiding means to the hull, said means for mounting providing a pivotable connection between the hull and said means for guiding;
   means for stopping the anchor chain, said means for stopping being coupled to said means for guiding though a second pivotable connection; and
   said means for stopping moving to a closed position under the force of gravity for stopping the anchor chain.

8. The apparatus as claimed in claim 7, further including latching means for latching said means for stopping in a position permitting passage of the anchor chain.

9. The apparatus as claimed in claim 8, further including means for securing the anchor chain, said means for securing being coupled at one end to said means for mounting and at another end to at least one chain link in the anchor chain.

10. An apparatus for anchoring an offshore structure, said offshore structure having an underwater surface, said anchoring apparatus comprising:

a frame member, said frame member being coupled to the underwater surface;
a mounting member, said mounting member being connected to said frame member;
a fairlead;
a chain stopper wherein said chain stopper comprises a flapper, said flapper being movable between an open position and a closed position, said flapper having a first slot for allowing passage of chain links in an anchor chain, and a chain link seat for preventing passage of chain links in the anchor chain in said closed position;
said mounting member including a shaft for connecting said fairlead and a pivoting coupler for coupling said chain stopper;
wherein said flapper is responsive to gravity and moves to said closed position under the force of gravity;
a safety cable mechanism comprising a safety cable and a coupler device;
said safety cable having one end connected to said mounting member and another end connected to said coupler device; and
said coupler device being fastened to at least one chain link in said anchor chain.

* * * * *